(12) United States Patent
Forsberg

(10) Patent No.: US 11,173,789 B2
(45) Date of Patent: Nov. 16, 2021

(54) ARRANGEMENTS AND METHODS FOR VEHICLES OPERABLE ON ELECTRICAL ROAD SYSTEMS

(71) Applicant: VOLVO TRUCK CORPORATION, Gothenburg (SE)

(72) Inventor: Hans Forsberg, Sävedalen (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 51 days.

(21) Appl. No.: 15/763,127

(22) PCT Filed: Oct. 7, 2015

(86) PCT No.: PCT/EP2015/073097
§ 371 (c)(1),
(2) Date: Mar. 26, 2018

(87) PCT Pub. No.: WO2017/059893
PCT Pub. Date: Apr. 13, 2017

(65) Prior Publication Data
US 2018/0290549 A1    Oct. 11, 2018

(51) Int. Cl.
*B60L 5/00* (2006.01)
*B60L 5/04* (2006.01)
(Continued)

(52) U.S. Cl.
CPC ............... *B60L 5/045* (2013.01); *B60L 5/005* (2013.01); *B60L 5/38* (2013.01); *B60L 53/126* (2019.02);
(Continued)

(58) Field of Classification Search
CPC .......... B60L 11/1831; B60L 5/34; B60L 5/38; B60L 5/045; B60L 5/005; B60L 53/39; B60L 53/12; B60M 1/30
See application file for complete search history.

(56) References Cited

U.S. PATENT DOCUMENTS 3,009,525 A    11/1961    Liban
3,468,391 A    9/1969    Rushing et al.
(Continued)

FOREIGN PATENT DOCUMENTS

CN    1302744 A    7/2001
CN    200995631 Y    12/2007
(Continued)

OTHER PUBLICATIONS

Office Action issued in corresponding Japanese Patent Application No. 2018-515834, dated Sep. 24, 2019.
(Continued)

*Primary Examiner* — Mathew Franklin Gordon
(74) *Attorney, Agent, or Firm* — Venable LLP; Jeffri A. Kaminski

(57) ABSTRACT

A method and an arrangement are provided for inductive positioning of a current collector on a vehicle relative to a stationary current conductor. The method involves transmitting a signal having predetermined phase characteristics using a signal transmitter arranged along the longitudinal direction of the current conductor; detecting the transmitted signal using a signal receiver on the vehicle, which signal receiver comprises at least one vertical antenna; detecting the phase characteristics of the signal induced in the at least one vertical antenna, indicating the relative location of the vertical antenna and the signal transmitter in the transverse direction of the vehicle; and controlling a positioning arrangement in dependence of the received signals.

29 Claims, 10 Drawing Sheets

(51) Int. Cl.
 B60L 5/38 (2006.01)
 B60L 53/39 (2019.01)
 B60L 53/126 (2019.01)
 B60M 1/30 (2006.01)
 B60L 5/34 (2006.01)

(52) U.S. Cl.
 CPC .............. B60L 53/39 (2019.02); B60L 5/34 (2013.01); B60M 1/30 (2013.01)

(56) References Cited

U.S. PATENT DOCUMENTS

| | | | |
|---|---|---|---|
| 3,614,990 A | 10/1971 | Schnitzler | |
| 3,669,205 A | 6/1972 | Brooke | |
| 3,924,084 A | 12/1975 | Lindfors | |
| 3,998,305 A | 12/1976 | Torok | |
| 4,472,716 A | 9/1984 | Hansen | |
| 6,522,436 B2* | 2/2003 | Roberts | G02B 6/12011 398/16 |
| 9,616,772 B2* | 4/2017 | Hourtane | B60L 5/39 |
| 9,796,272 B2* | 10/2017 | Richards | B60L 5/005 |
| 10,052,959 B2* | 8/2018 | Asplund | E01H 8/10 |
| 10,449,865 B2* | 10/2019 | Rumbak | B60L 53/12 |
| 2006/0251428 A1* | 11/2006 | Gieseler | H03F 3/45085 398/189 |
| 2010/0121509 A1 | 5/2010 | Takeshima et al. | |
| 2014/0027229 A1 | 1/2014 | Tojima et al. | |
| 2015/0260835 A1* | 9/2015 | Widmer | G01S 13/04 342/27 |
| 2016/0178740 A1* | 6/2016 | Sieber | G01S 13/04 342/43 |
| 2016/0318413 A1* | 11/2016 | Roehrl | B60L 11/1829 |

FOREIGN PATENT DOCUMENTS

| | | |
|---|---|---|
| CN | 201268556 Y | 7/2009 |
| CN | 202158861 U | 3/2012 |
| DE | 19935783 A1 | 2/2000 |
| DE | 10256705 A1 | 7/2004 |
| EP | 1582396 A1 | 10/2005 |
| JP | 2013198203 A | 9/2013 |
| WO | 2010121707 A1 | 10/2010 |
| WO | 2014180488 A1 | 11/2014 |

OTHER PUBLICATIONS

International Search Report (dated Jun. 28, 2016) far corresponding International App. PCT/EP2015/073097.
China Office Action dated Oct. 9, 2020 in corresponding China Patent Application No. 201580083545.6, 28 pages.
European Communication Pursuant to Article 93(3) EPC in corresponding European Patent Application No. 15775216.3, 7 pages.

\* cited by examiner

ARRANGEMENTS AND METHODS FOR VEHICLES OPERABLE ON ELECTRICAL ROAD SYSTEMS

BACKGROUND AND SUMMARY

The invention relates to an arrangement and a method for a vehicle operable on electrical road systems (ERS) where power can be transferred between a stationary conductor and the vehicle via a current collecting device. The invention facilitates locating the right position for the current collecting device in relation to the stationary conductor prior to and during power transfer.

The invention can be applied in heavy-duty vehicles, such as trucks, buses and construction equipment. Although the invention will be described with respect to a truck, the invention is not restricted to this particular vehicle, but may also be used in other vehicles such as automobiles, vans, pick-up trucks and light transport vehicles. The vehicles can be electric vehicles or hybrid electric vehicles.

The invention is mainly applicable for over-the-road vehicles, but is also applicable on working machines within the fields of industrial construction machines or construction equipment, such as wheel loaders, articulated haulers, excavators and backhoe loaders.

Detecting and locating a stationary conductor, such as an overhead power line or a road power rail, in order to position a pick-up shoe or similar relative to the overhead power line or the power rail can be a problem for non-track bound vehicles. In the case of a power rail an initial scan can be performed to detect the presence of a power rail, followed by a more exact location of the power rail to allow the pick-up shoe to be positioned.

Various methods have been suggested for locating power rails. One method involves using one or more inductive metal detectors. A problem with metal detectors is their limited range wherein a maximum detecting distance can be in the range 5 to 10 cm. This makes metal detectors unsuitable for the initial scan to detect the presence of a power rail. An alternative method involves using camera based vision systems, which can provide a lateral position accuracy of 5-10 cm. However, since a power rail can be approximately 10 cm wide the camera resolution becomes an issue, as an increased resolution comes with a price tag. Also, a forward or downward facing camera based vision system has to be kept clean and clear, which may require it to be placed behind the windshield. Ambient conditions, such as snow, ice and low light or darkness are other challenges related to vision systems.

Controlling a device or vehicle using inductive tracking of a signal wire is well known from autonomous trucks or from trolleybuses, as described in U.S. Pat. No. 3,924,084. This arrangement is used for overhead wires and involves detecting the signal strength of an alternating current (AC) in a signal wire. Using the pulses of the AC current in the signal wire, and optionally the magnetic fields of parallel direct current (DC) power lines, the pick-up shoes are guided into position. As this system operates using the signal strength only, the accuracy of the system will initially be relatively low. The signal strength of the field surrounding the signal not only varies with the lateral and vertical distance to the receiver antenna. Other properties such as dielectric and magnetic properties of material around the signal wire will cause distortions of the received signal strength. Consequently the pick-up arm will be hunting for the signal wire until it is sufficiently close to detect a more precise location.

It is desirable to eliminate the above problems with sensors having a short detecting range and to provide means suitable for an initial scan to find the road-rail as well as for accurate precision tracking. It is also desirable to provide means that can find and track a power rail irrespective of the ambient conditions.

It is desirable to provide an arrangement and a method for locating a stationary current conductor from a vehicle operable on electrical road systems (ERS) where power can be transferred between a stationary conductor and the vehicle via a current collecting device.

In the subsequent text the invention will be described in relation to a road power rail, or road rail. However, the invention is suitable for use in connection with both power rails and overhead power lines, commonly termed "stationary conductors" where applicable. Road power rails can be fully or partially recessed in one or more lanes of the road surface, or be located adjacent to and parallel with a lane along one side of the vehicle. The current collecting device or current collector contacting the stationary conductor and used for transmitting power between a stationary conductor and the vehicle will in some cases be referred to as a "pick-up shoe". The stationary conductor will be described as comprising two conductors for DC current, but the invention is not limited to this example and may also employ AC current.

The stationary conductor, in particular road rails, can be subdivided into predetermined, relatively short lengths. In order to eliminate the risk of persons, animals, etc. coming into contact with a live conductor each section can be energized as the vehicle is passing over the section. Such electric road systems (ERS) are known in the art and will not be described in detail.

According to a first aspect of the invention, a method relates to inductive positioning of a current collector on a vehicle relative to a stationary current conductor extending in the longitudinal direction of the vehicle. The vehicle comprises a current collector arranged to be displaced between a retracted, inactive first position and an operative second position in contact with the current conductor. Positioning means is provided for moving the current collector at least in the vertical direction of the vehicle.

In this context the positioning means is described as a displaceable arm or holder for the current collector, which arm can be displaced vertically either in a straight line or in an arcuate path relative to a pivot on the vehicle. The positioning means for such an arm can also comprise means for displacing the arm in the transverse direction of the vehicle, either in a straight line or in an arcuate path relative to a pivot on the vehicle. Alternatively, the transverse positioning means can comprise suitable control means connected to an electronically controllable steering system in the vehicle, wherein transverse positioning of the vehicle relative to the electrical conductor can be performed using a pair of steerable wheels. Positioning can further be performed using a combination of the above means, for instance if the vehicle must be displaced in the transverse direction to bring the current conductor within the transverse range of the displaceable arm carrying the current collector.

The method according to the invention involves performing the steps of:
  transmitting a signal having predetermined phase characteristics using a signal transmitter arranged along the longitudinal direction of the current conductor,
  detecting the transmitted signal using a signal receiver on the vehicle, which signal receiver comprises at least one vertical antenna;

detecting the phase characteristics of the signal induced in at least one vertical antenna, indicating the relative location of the vertical antenna and the signal transmitter in the transverse direction of the vehicle; and controlling the positioning means in dependence of the received signals.

An advantage of this method, which involves the transmission and detection of a signal having predetermined phase characteristics, is that it is possible to detect not only the exact position of the electrical conductor but also the direction from which an antenna is approaching the electrical conductor. An additional advantage is that the method allows the electrical conductor to be detected and tracked using a minimum of detectors, as a single vertical antenna is sufficient for detecting and tracking the electrical conductor.

According to one example, the method involves transmitting a signal comprising a continuous or intermittent pulse train having predetermined non-symmetric phase characteristics into the signal transmitter. The signal is induced into the signal receiver which determines the phase characteristics of the detected signal to determine the location of the vertical antenna and thereby the location of the current collector relative to the signal transmitter. The exact location of the signal transmitting current conductor is determined by monitoring the signal for a phase reversal which occurs when the antenna is located vertically above the current conductor. The signal receiver is expecting to receive a signal having a predetermined non-symmetric phase characteristics and will further monitor the currently detected phase of the non-symmetric portion of the signal. For instance, if the signal receiver detects a signal that can be matched to the expected signal, then the antenna is located on a first side of the current conductor. If the signal receiver detects a signal that can be matched to the expected signal but is 180° out of phase with the expected signal then the antenna is located on a second, opposite side of the current conductor. The positioning means is controlled in dependence of the received signal, whereby the current collector and/or the vehicle is displaced in the transverse direction to locate the current collector relative to the current conductor.

According to a further example, the method involves transmitting a signal comprising a continuous or repeated intermittent asymmetric pulse train having predetermined phase characteristics into the signal transmitter. The continuous or intermittent pulse trains described above can be amplitude modulated pulse trains.

According to a further example, the method involves transmitting a signal comprising a continuous or intermittent pulse train generated by a digital modulation scheme. For instance, the transmitted signal can be generated by phase shift keying (PSK). Phase-shift keying or PSK is a digital modulation scheme that conveys data by changing, or modulating, the phase of a reference signal which in this case is the transmitted signal. Any digital modulation scheme uses a finite number of distinct signals to represent digital data. PSK uses a finite number of phases; each assigned a unique pattern of binary digits. Usually, each phase encodes an equal number of bits. Each pattern of bits forms the symbol that is represented by the particular phase. The demodulator, which is designed specifically for the symbol-set used by the modulator, determines the phase of the received signal and maps it back to the symbol it represents, thus recovering the original data. This requires the receiver to be able to compare the phase of the received signal to a reference signal. Such a system is termed coherent and is referred to as CPSK.

According to a further example, the method involves transmitting a signal comprising a continuous or intermittent pulse train comprising a Fourier series. In mathematics, a Fourier series is a way to represent a wave-like function as the sum of simple sine waves. More formally, it decomposes any periodic function or periodic signal into the sum of a possibly infinite set of simple oscillating functions, namely sines and cosines or, equivalently, complex exponentials. A suitable Fourier series for use with the method according to the invention is a non-sinusoidal waveform. Non-sinusoidal waveforms are waveforms that are not pure sine waves. They are usually derived from simple math functions. While a pure sine consists of a single frequency, non-sinusoidal waveforms can be described as containing multiple sine waves of different frequencies. These component sine waves will be whole number multiples of a fundamental or a lowest frequency. The frequency and amplitude of each component can be found using a mathematical technique known as Fourier analysis which will not be described here. Examples of non-sinusoidal waveforms include square waves, rectangular waves, triangle waves, spiked waves, trapezoidal waves and saw tooth waves. Examples of suitable waveforms will be described in further detail below.

According to a further example, the method involves transmitting a signal comprising a continuous or intermittent pulse train comprising a pseudo-random noise sequence. Pseudo random noise (PRN) is a signal similar to noise which satisfies one or more of the standard tests for statistical randomness. Although it seems to lack any definite pattern, pseudo random noise consists of a deterministic sequence of pulses that will repeat itself after a predetermined period.

According to a further example, the method involves transmitting a signal comprising a continuous or intermittent pulse train comprising a frequency modulated pulse train. One frequency modulation scheme in which digital information is transmitted through discrete frequency changes of a carrier wave is termed frequency-shift keying (FSK). The simplest FSK is binary FSK (BFSK). BFSK uses a pair of discrete frequencies to transmit binary information using zeros and ones. With this scheme, the "1" is called the mark frequency and the "0" is called the space frequency.

According to a further example, the method involves detecting signals induced in at least two transversely spaced vertical antennas and comparing phase characteristics of each signal to determine the location of the current collector relative to the signal transmitter. The use of multiple vertical antennas has the advantage that accuracy in locating the current conductor can be improved. For instance, the location of the current conductor can be speeded up by an initial displacement of the current collector in the transverse direction towards the current conductor at a relatively higher speed. The transverse displacement can be slowed towards a relatively lower speed when detected signals from the vertical antennas indicate that the current collector is approaching the current conductor. Tracking of the current conductor can be improved by using multiple vertical antennas to permit a predetermined allowable displacement of the current collector in the transverse direction before a correction is required.

According to a further example, the method involves detecting the phase characteristics, phase shift and amplitude of the signal induced in at least one vertical antenna. The phase characteristics and phase shift of the signal indicate the location of the vertical antenna relative to the longitudinal direction of the signal transmitter. The detected amplitude of the received signal can be compared to the amplitude of the transmitted signal, supplying additional information relating to an approximate distance between the one or more antennas and the current conductor. This information can then be used to for positioning the current collector relative to the current conductor during the tracking operation.

According to the invention the ERS current collector positioning and tracking is performed in two steps. Initially the current collector will be in a retracted idling position, relatively high up from ground. From this idling position, a sensor arrangement on the current collector is arranged to identify the presence of the power rails, where after the current collector is at least partially lowered and moved to follow the power rails as the signal strength increases. This first step involves the stages of identifying the presence of a power rail, followed by scanning for and finding the current conducting power rail as the current collector is gradually lowered towards the road surface. The current collector can be displaced substantially vertically to an intermediate position between the first and second positions. Alternatively the current collector can be displaced in a continuous movement past an intermediate position towards the second position.

The current collector can be displaced substantially vertically or vertically and transversely relative to the vehicle. If the displacement is vertical only, then a control unit controlling the current collector must also be connected to the vehicle steering system in order to steer the vehicle for transverse positioning of the current collector. Alternatively the current collector itself can be displaceable both vertically and transversely. This can be achieved by means of a first actuator controlling vertical displacement and a second actuator controlling transverse displacement. Either actuator can be arranged to displace the current collector along a rectilinear path or along a curved path relative to a pivot. Examples of suitable actuators for vertical and transverse displacement of the current collector relative to the vehicle can comprise one or more pneumatic or hydraulic cylinders, linear or rotary electric motors, or suitable mechanical actuators.

A second step involves lowering the current collector from or continuously past the partially lowered intermediate position into the second position in mechanical and electrical contact with the current conducting power rail. The vertical and transverse displacement during the second step and the exact locating of the current conductor requires precision tracking. In this precision tracking state, in particular when the current collector is in its active state in the second position, the tracking and displacement control need to be performed with centimeter accuracy. Location of the current conductor is performed using the at least one detected signal from one or more signal receivers, which signal is used for controlling the positioning means to move the current collector at least transversely to track the current conductor. As indicated above the transmitted signal is induced in at least one vertical antenna.

According to a second aspect of the invention, an arrangement relates to the transmission of electric power between a current conductor and a vehicle. The arrangement comprises a current collector mounted on the vehicle and arranged to be displaced between a retracted first position and an operative second position in contact with the current conductor. The arrangement further comprises positioning means for moving the current collector at least in the vertical direction of the vehicle. A signal transmitter is connected to the current conductor, which will act as an elongated extension of the signal transmitter, and a signal receiver is arranged on the vehicle to receive signals from the signal transmitting current conductor. A control device is provided for controlling the positioning means in dependence of the received signals. According to the invention the signal receiver comprises at least one vertical antenna arranged to monitor the received signal and to detect phase characteristics of the signal induced in the vertical antenna. The phase characteristics indicate the relative location of the vertical antenna and the signal transmitter in the transverse direction of the vehicle.

According to one example the signal transmitter is arranged to emit a signal comprising a continuous or intermittent pulse train having predetermined non-symmetric phase characteristics into the signal transmitter. The signal is induced into the signal receiver which is arranged to determine the phase characteristics of the detected signal in order to determine the location of the vertical antenna and thereby the location of the current collector relative to the signal transmitting current conductor. The exact location of the signal transmitting current conductor is determined by monitoring the signal for a phase reversal which occurs when the antenna is located vertically above the current conductor. The signal receiver is expecting to receive a signal having a predetermined non-symmetric phase characteristics and will also monitor the currently detected phase of the non-symmetric portion of the signal.

According to a further example, the signal transmitter is arranged to emit a continuous or repeated intermittent asymmetric pulse train having predetermined phase characteristics into the signal transmitter. The continuous or intermittent pulse trains described above can be amplitude modulated pulse trains.

As described above, the signal transmitter can be arranged to emit a signal comprising a digital modulation scheme a Fourier series, a pseudo-random noise sequence. The continuous or intermittent pulse trains can be amplitude and/or frequency modulated.

According to a further example, the control device is arranged to determine the phase characteristics of signals detected by two or more transversely spaced vertical antennas and to compare phase characteristics of each signal to determine the location of the vertical antennas relative to the longitudinal direction of the signal transmitter.

According to a further example, the signal receiver comprises at least one vertical antenna arranged to monitor the received signal and to detect a phase reversal of the signal induced in the vertical antenna, indicating that the vertical antenna is located vertically above the signal transmitter.

According to a further example, at least one vertical antenna is arranged on a fixed location on the vehicle. Alternatively, or in addition, at least one vertical antenna is arranged on the current collector.

According to a third aspect of the invention, a vehicle is operable as a component part of the above-mentioned arrangement.

According to a fourth aspect of the invention, a computer program is provided comprising program code means for performing the above-mentioned method steps for inductive positioning of a current collector on a vehicle relative to a current conductor when said program is run on a computer. The invention further relates, according to an aspect thereof, to a computer readable medium carrying a computer program comprising program code means for performing the above-mentioned method steps for controlling vehicle speed in a vehicle equipped with brake cruise control when said program product is run on a computer. Finally, the invention further relates, according to an aspect thereof, to a control unit for controlling vehicle speed in a vehicle equipped with brake cruise control, the control unit being configured to perform the steps of the above-mentioned method.

An advantage of the invention is that it allows a current conductor such as a road rail to be detected, located and tracked with a minimum of sensors. The invention allows for exact location and tracking of the current conductor, where one or more sensors on the vehicle can detect both the position of the current conductor and from which direction the sensor and the associated current collector is approaching the current conductor.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
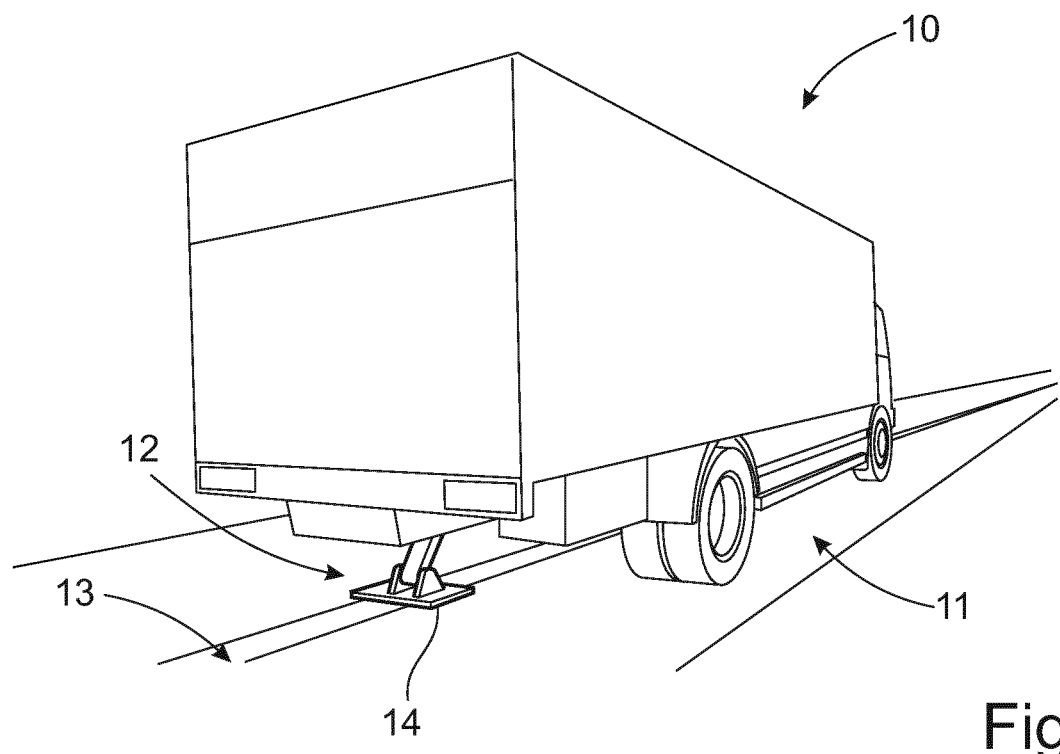
FIG. 1 shows a schematic electric road system according to the invention.

FIG. 1 shows a schematic electric road system (ERS) where a vehicle 10 is travelling on a road 11 provided with means for supplying electric current to the vehicle 10. The vehicle 10 is provided with a power collecting arrangement 12 which can be lowered into contact with a current conductor 13 located in the surface of the road 11. The vehicle can be an electric vehicle or a hybrid electric vehicle.

The power collecting arrangement 12 comprises a current collector 14 arranged to be displaced between a retracted, inactive first position and an operative second position in contact with the current conductor 13 using suitable actuators. Positioning means is provided for moving the current collector 14 at least in the vertical direction of the vehicle.

In this context the positioning means will be described as a displaceable arm or holder for the current collector, which arm can be displaced vertically either in a straight line or in an arcuate path relative to a pivot on the vehicle. The positioning means for such an arm can also comprise means for displacing the arm in the transverse direction of the vehicle, either in a straight line or in an arcuate path relative to a pivot on the vehicle. Alternatively, the transverse positioning means can comprise suitable control means connected to an electronically controllable steering system in the vehicle, wherein transverse positioning of the vehicle relative to the electrical conductor can be performed using a pair of steerable wheels. Positioning can further be performed using a combination of the above means, for instance if the vehicle must be displaced in the transverse direction to bring the current conductor within the transverse range of the displaceable arm carrying the current collector. The design of the power collecting arrangement will not be described in further detail here.

Figure 2:
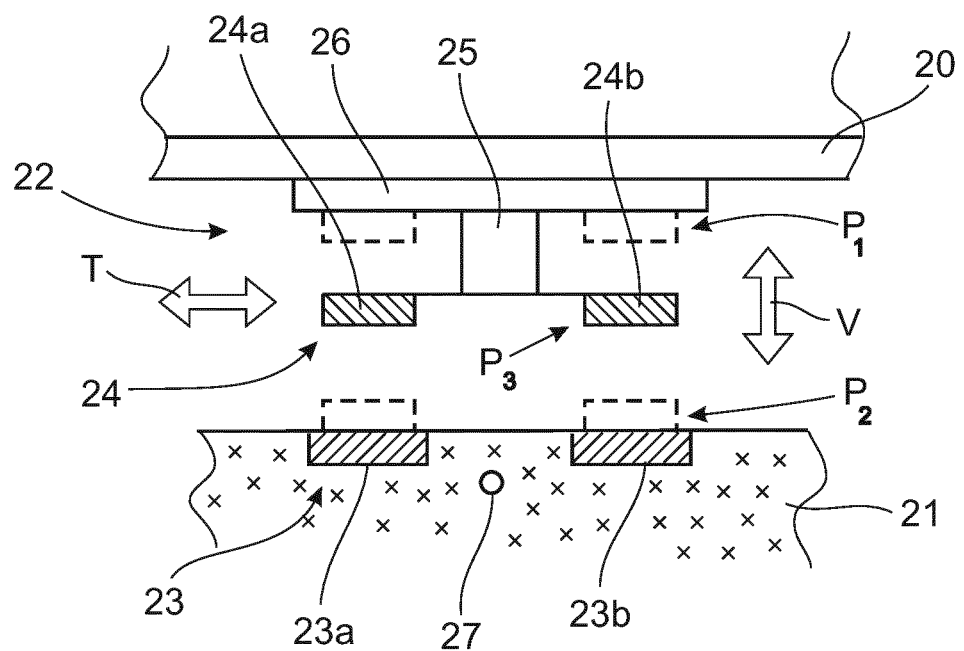
FIG. 2 shows a schematic front view of a power collecting arrangement according to the invention.

FIG. 2 shows a schematic front view of a power collecting arrangement 22 according to the invention. The power collecting arrangement 22 is mounted on a schematically indicated vehicle 20 located over a schematic section of a road 21. A current conductor 23 comprising a first and a second power rail 23a, 23b for supplying DC current is located in the surface of the road 21. The power collecting arrangement 22 comprises a current collector 24 with a first and a second contactor 24a, 24b for collecting current from the respective first and a second power rails 23a, 23b. The current collector 24 is attached to a vertical positioning means 25 for displacing the current collector 24 from a retracted first position P1 adjacent the vehicle 20 to an active second position P2 in contact with the current conductor 23. The vertical displacement is indicated by the arrow V. The lowering of the current collector 24 into the active, second position is performed when its detected that the first and second contactors 24a, 24b are vertically aligned with their respective first and second power rails 23a, 23b.

In FIG. 2 the current collector 24 is shown in an optional intermediate position P3. The current collector 24 can be displaced vertically to the intermediate position P3 between the first and second positions P1, P2 in order to locate the current conductor 23 prior to lowering the current collector 24 into the second position P2. Alternatively the current collector can be displaced in a continuous movement from the first position, past the intermediate position, and into the second position.

In the example shown in FIG. 2, the current collector 24 and the vertical positioning means 25 are attached to a transverse positioning means 26. The vertical positioning means 26 is arranged to displace the current collector 24 and the vertical positioning means 25 in the transverse direction of the vehicle 20 as indicated by the arrow T. The transverse positioning means 26 is controlled to displace the current collector 24 in the transverse direction of the vehicle 20, initially to locate and subsequently to track the current conductor 23. Tracking is performed to maintain the first and second contactors 24a, 24b in vertical alignment with their respective first and second power rails 23a, 23b. According to the example in FIG. 2, locating and tracking the current conductor 23 is performed by using one or more vertical antennas (see FIGS. 3-5) used for detecting the position of a signal cable 27 located between or adjacent the current conductor 23.

Figure 3:
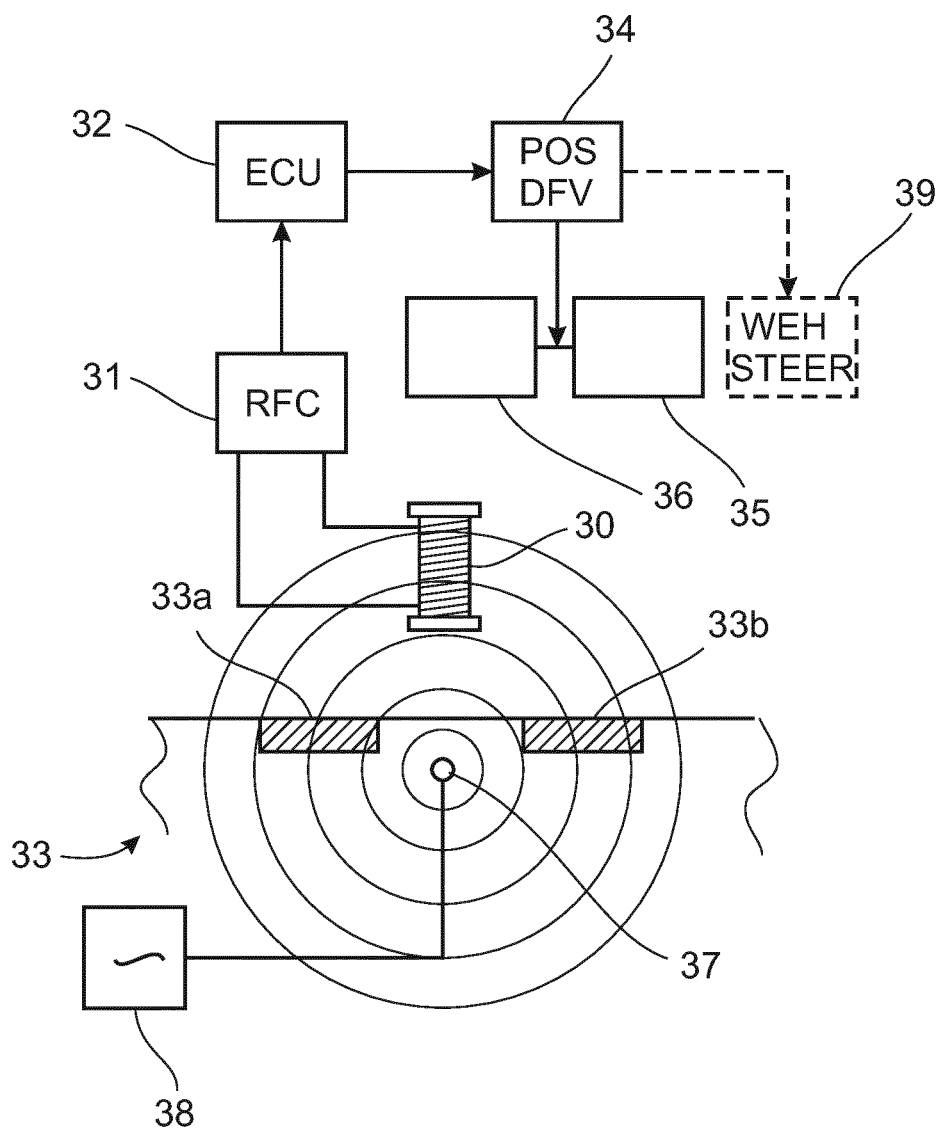
FIG. 3 shows a schematic diagram of a control arrangement for a positioning means according to the invention.

FIG. 3 shows a schematic diagram of a control arrangement for controlling a positioning means as described above for locating and tracking a first and a second power rail 33a, 33b. The control arrangement comprises a vertical antenna 30 that is preferably, but not necessarily, mounted at a suitable location on or adjacent a current collector (not shown). The vertical antenna 30 is connected to a signal receiver 31 for detecting a signal induced into the vertical antenna 30. An output signal from the signal receiver 31 is transmitted to an electronic control unit (ECU) 32, which is arranged to process the output signal and generate control signals to a position controller 34. The position controller 34 is arranged to determine the required displacement to be performed by a vertical actuator 35 and a transverse actuator 36 in order to move the current collector into alignment with the first and second power rails 33a, 33b of the current conductor.

According to an alternative example, the transverse actuator 36 can be eliminated or supplemented by an optional vehicle steering actuator 39. The vehicle steering actuator 39 can be used instead of the transverse actuator 36 for moving the vehicle in the transverse direction of the current conductor, or together with the transverse actuator 36 for moving the vehicle if the current conductor is not within the displaceable range of the transverse actuator 36.

In operation the vertical antenna 30 will monitor the presence or absence of a predetermined signal transmitted from a signal cable 37 located in the road at a predetermined location relative to the first and second power rails 33*a*, 33*b*. The signal is generated by a signal generator 38 connected to the signal cable 37 and has a predetermined signal characteristics. When the vertical antenna 30 is within range the signal will be induced into the vertical antenna 30 and detected by the signal receiver 31. In response to the detected signal transmitted from the receiver to the ECU 32, the ECU 32 will determine if the current collector should be deployed, lowered into its active position or be retracted. The output from the signal receiver 31 contains data relating to signal strength and amplitude, as well as the phase characteristics of the signal which data is continuously processed by the ECU 32. In response to the received signal data the ECU 32 transmits control signals to the position controller 34, which determines the required displacement for each of the vertical and the transverse actuators 36 35 for maintaining the current collector in transverse alignment with the current conductor. When the signal ceases, for instance at the end of an ERS road, the ECU 32 will transmit a signal to the position controller 34 to actuate the vertical actuator 35 and retract the current collector.

Figure 4A:
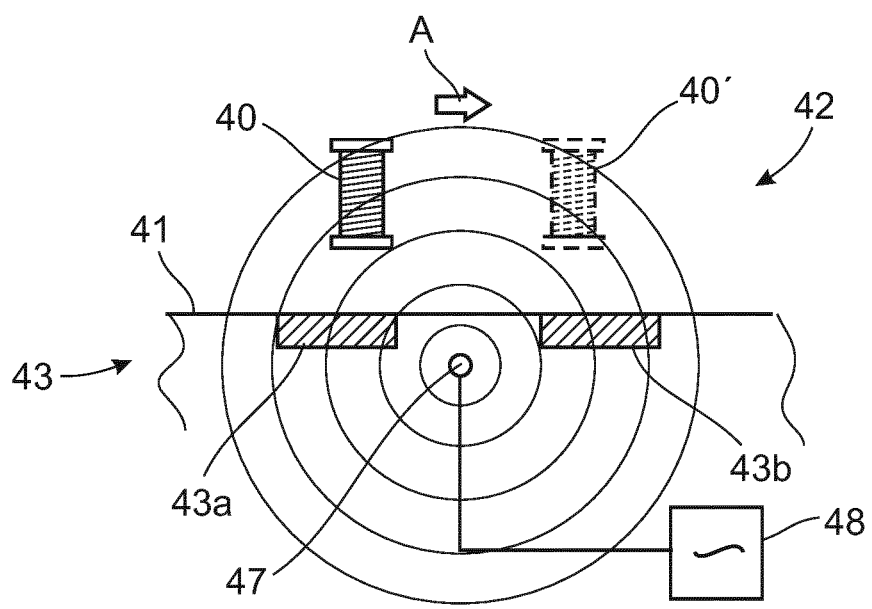
FIGS. 4A-B show a schematic illustration of the principle utilized by the invention when using a single vertical antenna.
Figure 4B:
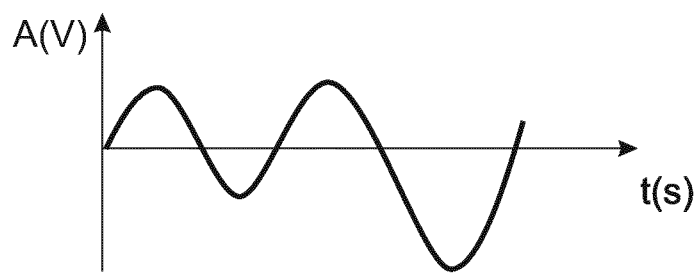
Figure 4B:
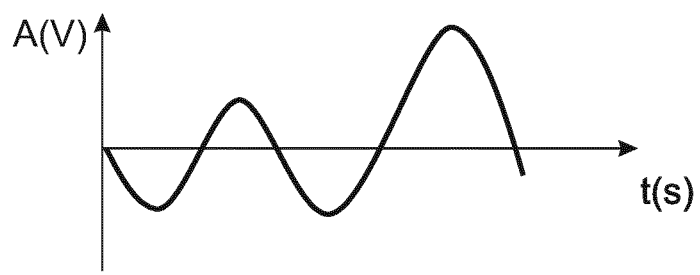

FIGS. 4A and 4B show a schematic illustration of the principle utilized by the invention. A single vertical antenna 40 mounted on a current collector (not shown) is arranged over a road 41 in which a first and a second power rail 43*a*, 43*b* of a current conductor are arranged. As the vertical antenna 40 is displaced parallel to the surface of the road 41 it passes through a magnetic field 42 around a signal cable 47 located in the road 41 at a predetermined location relative to the first and second power rails 43*a*, 43*b*. The magnetic field is caused by an AC current passing through the signal cable 47 and is indicated by concentric circles. The signal is generated by a signal generator 48 connected to the signal cable 47 and has a predetermined signal characteristics. The transmitted signal comprises a continuous or intermittent pulse train having predetermined non-symmetric phase characteristics that is superimposed on the AC current into the signal cable 47 which acts as a signal transmitter. A signal is induced into the antenna 40 and is transmitted to a signal receiver (see FIG. 3) which determines the phase characteristics of the detected signal to determine the location of the vertical antenna 40 and thereby the location of the current collector relative to the signal cable 47. The exact location of the signal cable 47 is determined by monitoring the signal for a phase reversal which occurs when the vertical antenna 40 is located vertically above the signal cable 47. The signal receiver connected to the vertical antenna 40 is expecting to receive a signal having a predetermined non-symmetric phase characteristics and will further monitor the currently detected phase of the non-symmetric portion of the signal.

FIG. 4B shows two schematic diagrams where the amplitude of a pulse train has been plotted over time. The pulse train in the lower diagram is 180° out of phase with the pulse train in the upper diagram. As shown in FIG. 4B, if the signal receiver detects an asymmetric pulse train as illustrated by the upper curve which is matched to an expected signal having the same non-symmetric phase characteristics, then the antenna 40 is located on a first side of the signal cable 47. However, if the signal receiver detects a signal that can be matched to the expected signal but is 180° out of phase with the expected signal then the antenna is located on a second, opposite side of the signal cable 47. This is illustrated in FIG. 4A where the antenna 40' shown in dashed lines has been displaced transversely in the direction of the arrow A past the signal cable 47. A positioning means (see FIG. 2) is controlled in dependence of the received signal, whereby the current collector and/or the vehicle is displaced in the transverse direction to locate the current collector relative to the current conductor. By monitoring the amplitude of the received signal it is also possible to estimate the transverse distance between the vertical antenna 40 and the signal cable 47. During tracking of the current conductor the phase characteristics will determine on which side of the signal cable the vertical antenna is located and the magnitude of the amplitude can be monitored to determine when corrective action needs to be taken to displace the current collector into alignment with the current conductor (see FIG. 2).

Figure 5A:
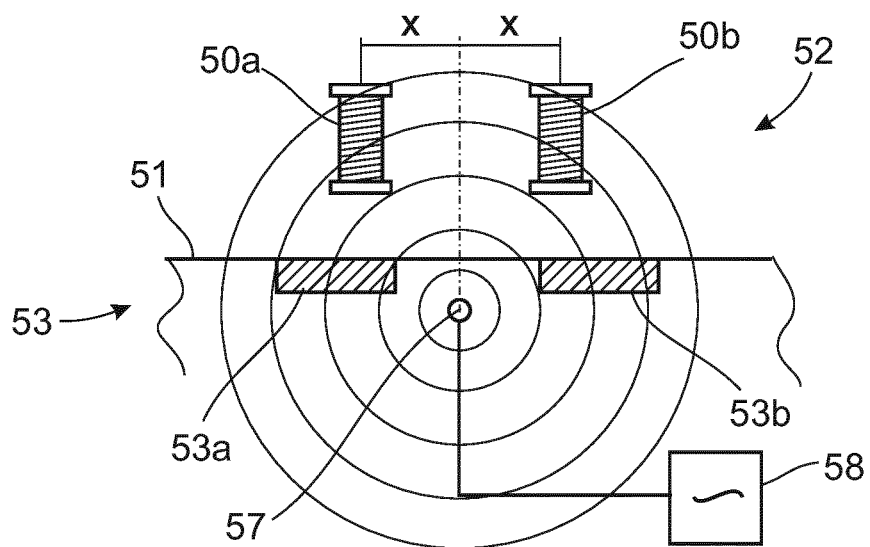
FIGS. 5A-B show a schematic illustration of the principle utilized by the invention when using a pair of vertical antennas.
Figure 5B:
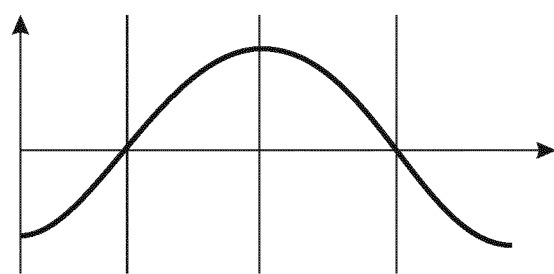
Figure 5B:
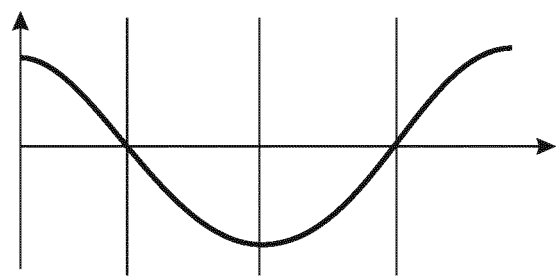

FIGS. 5A and 5B show an alternative schematic illustration of the principle utilized by the invention. A pair of vertical antennas 50*a*, 50*b* mounted on a current collector (not shown) are arranged over a road 51 in which a first and a second power rail 53*a*, 53*b* of a current conductor are arranged. As the vertical antennas 50*a*, 50*b* are displaced parallel to the surface of the road 51 they pass through a magnetic field 52 around a signal cable 57 located in the road 51 at a predetermined location relative to the first and second power rails 53*a*, 53*b*. The magnetic field is caused by an AC current passing through the signal cable 57 and is indicated by concentric circles. A signal is generated by a signal generator 58 connected to the signal cable 57 and has a predetermined signal characteristics. The transmitted signal comprises a continuous or intermittent pulse train having predetermined non-symmetric phase characteristics that is superimposed on the AC current into the signal cable 57 which acts as a signal transmitter. The signal is induced into the antennas 50*a*, 50*b* and is transmitted to a signal receiver (see FIG. 3) which determines the phase characteristics of the detected signal to determine the location of the vertical antennas 50*a*, 50*b* and thereby the location of the current collector relative to the signal cable 57. The exact location of the signal cable 57 is determined by monitoring the signal for a phase reversal which occurs when one of the vertical antennas 50*a*, 50*b* is located vertically above the signal cable 47. The signal receiver connected to the vertical antennas 50*a*, 50*b* is expecting to receive a signal having a predetermined non-symmetric phase characteristics and will further monitor the currently detected phase of the non-symmetric portion of the signal. As shown in the example in Figure SA, the current collector is located in vertical alignment with the first and second power rails 53*a*, 53*b* of the current conductor when a vertical plane through the central axis of the signal cable 57 (indicated by a dash-dotted line) is located in a position halfway between the vertical coils 50*a*, 50*b*, indicated by the distance x in Figure SA. According to one example, the spacing between the vertical coils 50*a*, 50*b* can be selected to represent the maximum allowable relative movement of the current collector relative to the current conductor in the transverse direction during a tracking operation.

FIG. 5B shows two schematic diagrams where the amplitude of a part of a pulse train has been plotted over time. The partial pulse train in the lower diagram is 180° out of phase with the pulse train in the upper diagram. As shown in FIG. 5B, if the signal receiver detects an asymmetric pulse train as illustrated by the upper curve which is matched to an expected signal having the same non-symmetric phase characteristics, then the antennas 50a, 50b are located on a first side of the signal cable 47. However, if the signal receiver detects a signal that can be matched to the expected signal but is 180° out of phase with the expected signal then the antennas 50a, 50b are located on a second, opposite side of the signal cable 47. If the signal receiver detects an asymmetric pulse train as illustrated by the upper curve from a first vertical antenna 50a and an asymmetric pulse train 180° out of phase with the expected signal as illustrated by the lower curve from a second vertical antenna 50b, then the vertical antennas 50a, 50b are located on either side of the signal cable 57. By monitoring the amplitude of the received signals it is also possible to estimate the transverse distance between the respective vertical antennas 50a, 50b and the signal cable 57. When the received signals are 180° out of phase and have the same amplitude then the current collector is located in vertical alignment with the first and second power rails 53a, 53b of the current conductor. During tracking of the current conductor the phase characteristics will determine on which side of the signal cable each of the vertical antennas are located and appropriate corrective action can be to displace the current collector into alignment with the current conductor (see FIG. 2) when a phase change indicates that both vertical antennas are located to the same side of the signal cable.

FIGS. 6A-B to 10A-B show a number of non-limiting schematic examples of suitable signals comprising pulse trains having predetermined signal characteristics.

Figure 6A:
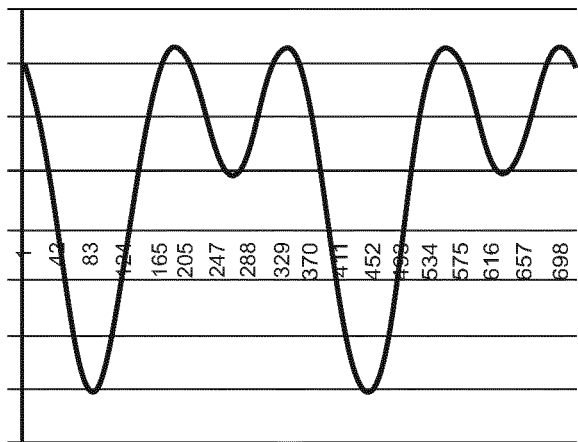
FIGS. 6-10 show schematic examples of pulse trains for use in a control arrangement according to the invention.
Figure 6B:
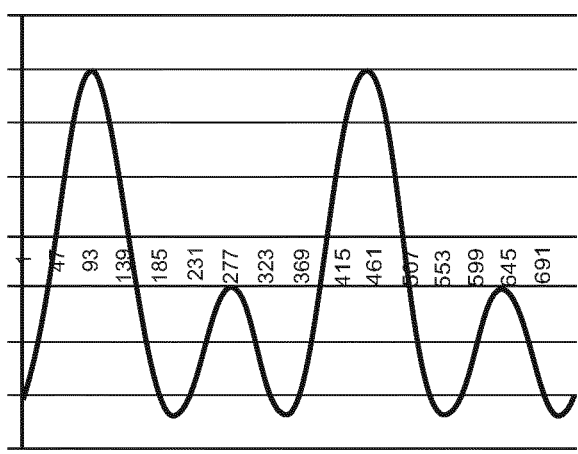

FIG. 6A-B shows an example of a signal comprising a continuous or intermittent pulse train which comprises a Fourier series. In mathematics, a Fourier series is a way to represent a wave-like function as the sum of simple sine waves. More formally, it decomposes any periodic function or periodic signal into the sum of a possibly infinite set of simple oscillating functions, namely sines and cosines or, equivalently, complex exponentials. The particular pulse train shown in FIG. 6A is sine-cosine combination. FIG. 6B shows the same pulse train, but 180° out of phase.

Figure 7A:
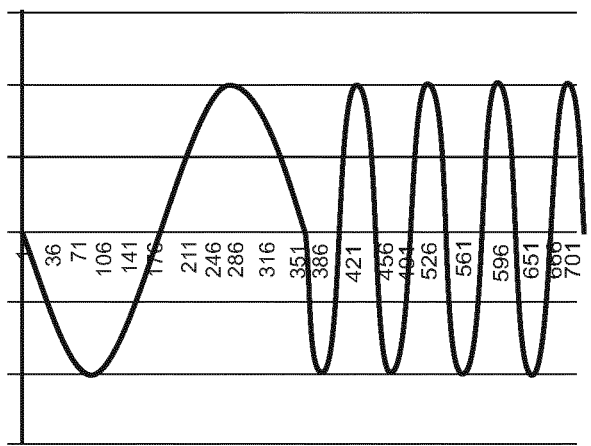
Figure 7B:
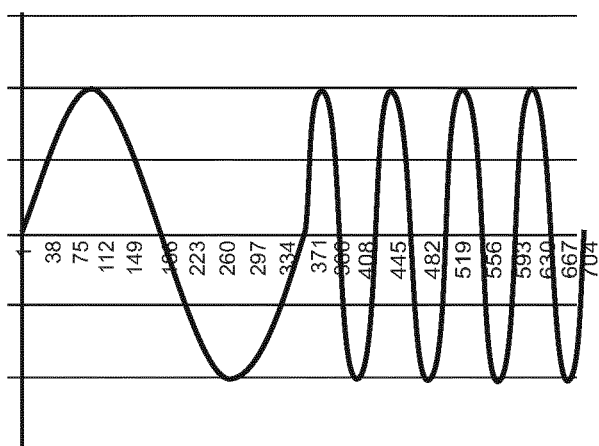

FIG. 7A-B shows an example of a signal comprising a continuous or intermittent pulse train comprising a frequency modulated signal. The particular pulse train shown in FIG. 7A is a combination comprising a relatively lower frequency sine pulse followed by a set number of relatively lower frequency sine pulses. FIG. 7B shows the same pulse train, but 180° out of phase.

Figure 8A:
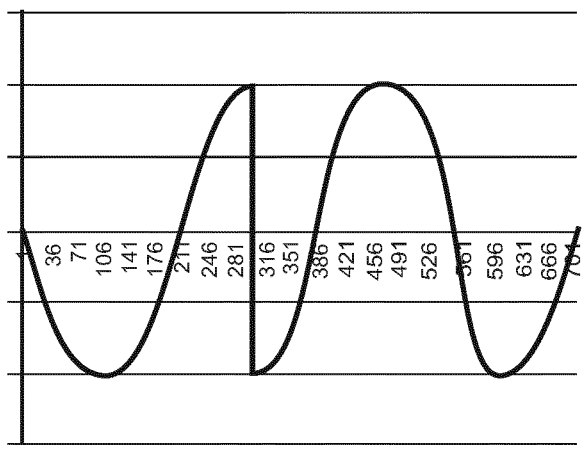
Figure 8B:
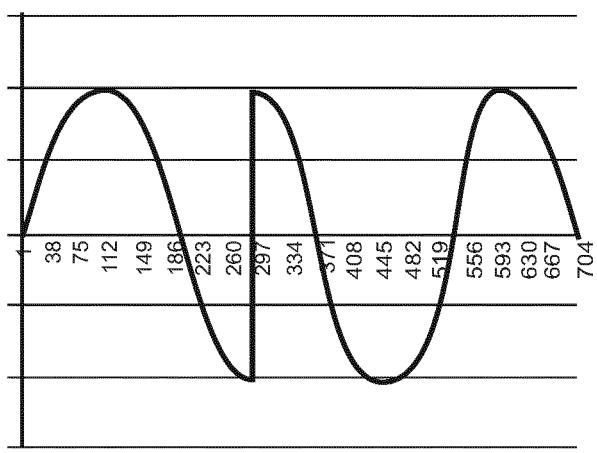

FIG. 8A-B shows an example of a signal comprising a continuous or intermittent pulse train generated by a digital modulation scheme. For instance, the transmitted signal can be generated by phase shift keying (PSK). Phase-shift keying or PSK is a digital modulation scheme that conveys data by changing, or modulating, the phase of a reference signal which in this case is the transmitted signal. FIG. 8A shows an example of a PSK signal and FIG. 8B shows the same pulse train, but 180° out of phase.

Figure 9A:
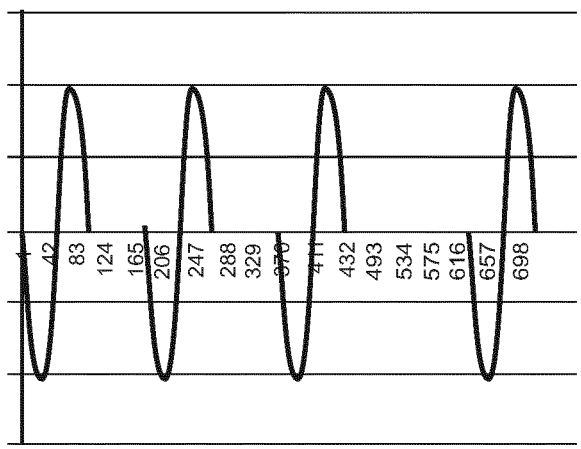
Figure 9B:
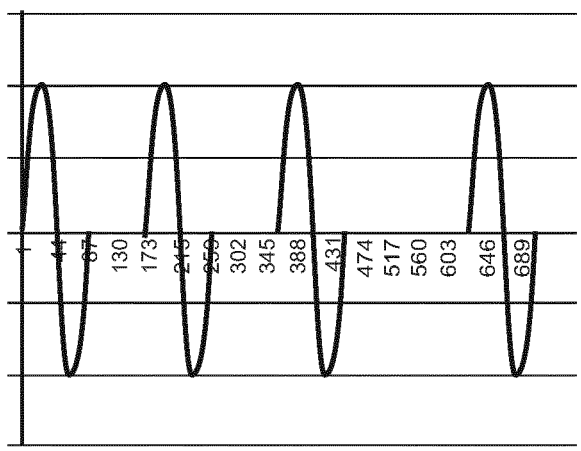

FIG. 9A-B shows an example of a pulse train comprising an intermittent series of short pulses, in this case sine pulses. The example shown in FIG. 9A illustrates a pulse train comprising a series of three sine pulses with equal time separation, followed by a fourth sine pulses with a different time separation. FIG. 9B shows the same pulse train, but 180° out of phase.

Figure 10A:
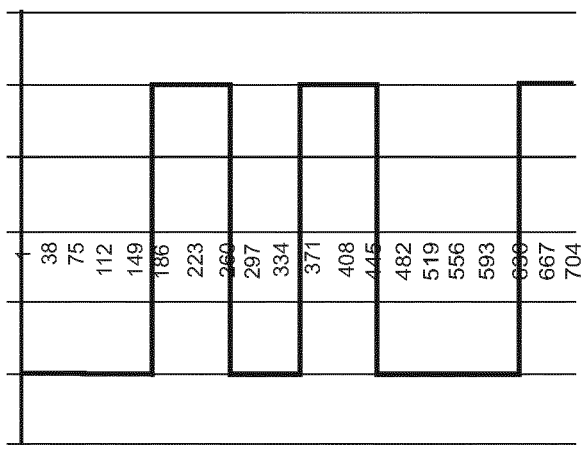
Figure 10B:
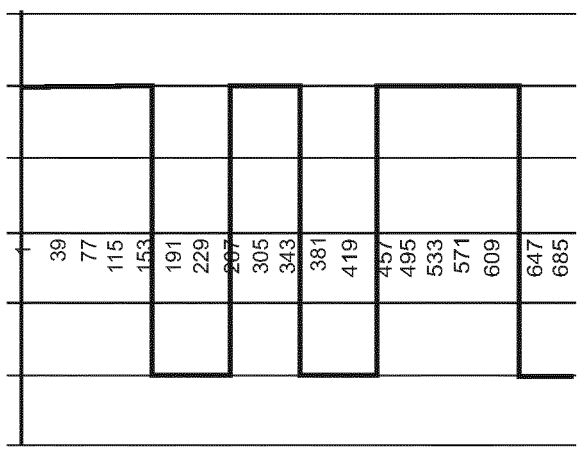

FIG. 10A-B shows an example of a pulse train comprising a digital signal using square pulses. A similar example of a signal comprising a continuous or intermittent pulse train can be a pseudo-random noise (PRN) sequence. The example shown in FIG. 10A illustrates a pulse train comprising a series of regular pulses with a constant duration, separated by a series of pulses having a relatively shorter duration, creating an asymmetric pulse train. FIG. 10B shows the same pulse train, but 180° out of phase.

In all the above examples a signal receiver will monitor the signal induced in a vertical antenna for an expected signal generated by a signal generator and transmitted by a signal cable. If the induced signal corresponds to the expected signal, say a pulse train as indicated in FIG. 6A, 7A, 8A, 9A or 10A, the vertical antenna is located on a first side of the signal cable. However, if the induced signal is 180° out of phase with the expected signal, say a pulse train as indicated in FIG. 6B, 7B, 8B, 9B or 10B, the vertical antenna is located on the opposite side of the signal cable.

The present invention also relates to a computer program, computer program product and a storage medium for a computer all to be used with a computer for executing the method as described in any one of the above examples.

Figure 11:
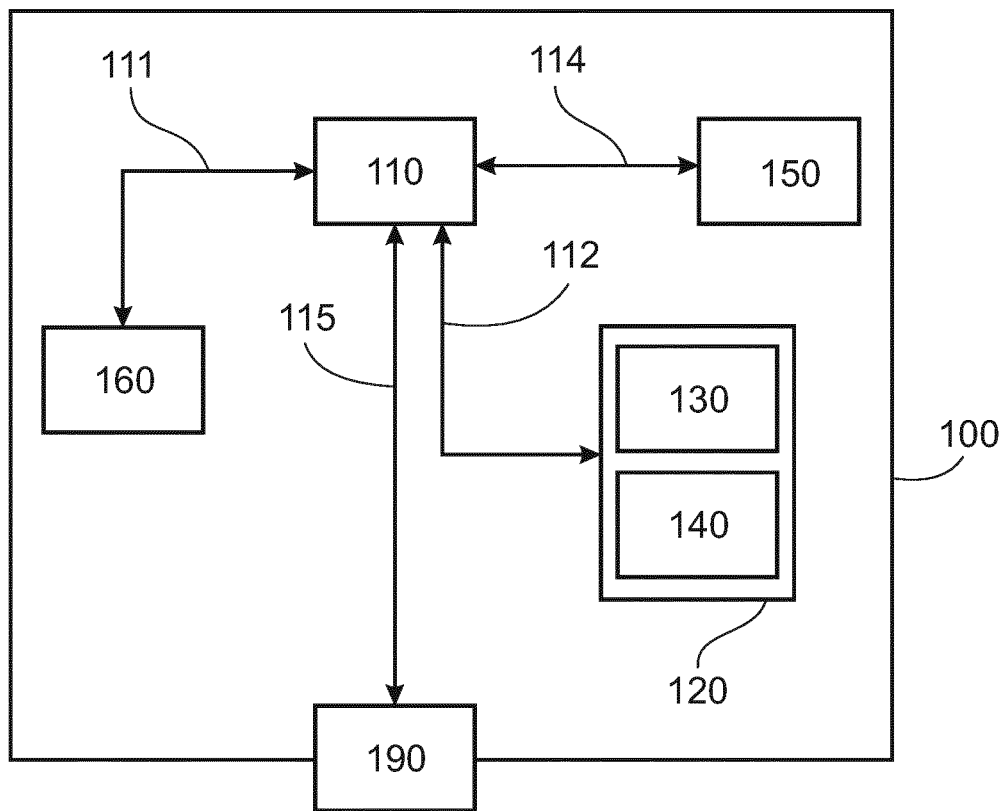
FIG. 11 shows the invention applied on a computer arrangement.

FIG. 11 shows an apparatus 100 according to one embodiment of the invention, comprising a non-volatile memory 120, a processor 110 and a read and write memory 160. The memory 120 has a first memory part 130, in which a computer program for controlling the apparatus 100 is stored. The computer program in the memory part 130 for controlling the apparatus 100 can be an operating system.

The apparatus 100 can be enclosed in, for example, a control unit, such as the control unit 32 (FIG. 3). The data-processing unit 110 can comprise, for example, a microcomputer.

The memory 120 also has a second memory part 140, in which a program for controlling the target gear selection function according to the invention is stored. In an alternative embodiment, the program for controlling the transmission is stored in a separate non-volatile storage medium 150 for data, such as, for example, a CD or an exchangeable semiconductor memory. The program can be stored in an executable form or in a compressed state.

When it is stated below that the data-processing unit 110 runs a specific function, it should be clear that the data-processing unit 110 is running a specific part of the program stored in the memory 140 or a specific part of the program stored in the non-volatile storage medium 120.

The data-processing unit 110 is tailored for communication with the storage memory 120 through a data bus 114. The data-processing unit 110 is also tailored for communication with the memory 120 through a data bus 112. In addition, the data-processing unit 110 is tailored for communication with the memory 160 through a data bus 111. The data-processing unit 110 is also tailored for communication with a data port 190 by the use of a data bus 115.

It is to be understood that the present invention is not limited to the embodiments described above and illustrated in the drawings; rather, the skilled person will recognize that many changes and modifications may be made within the scope of the appended claims.

The invention claimed is:

1. Method for inductive positioning of a current collector on a vehicle relative to a stationary current conductor, the vehicle comprising the current collector arranged to be displaced between a retracted first position and an operative second position in contact with the current conductor; positioning means for moving the current collector at least in the vertical direction of the vehicle; the method involving performing the steps of: transmitting a signal having predetermined phase characteristics using a signal transmitter arranged along the longitudinal direction of the current conductor; detecting the transmitted signal using a signal receiver on the vehicle, which signal receiver comprises multiple transversely spaced vertical antennas; detecting the phase characteristics of the signals induced in the multiple transversely spaced vertical antennas, indicating the relative location of the vertical antennas and the signal transmitter in the transverse direction of the vehicle; comparing phase characteristics of each signal to determine the transverse location of the vertical antennas relative to the longitudinal direction of the signal transmitter; and controlling the positioning means in dependence of the received signals and the determined location of the vertical antennas relative to the signal transmitter.

2. Method according to claim 1, comprising transmitting a signal comprising a pulse train having predetermined non-symmetric phase characteristics into the signal transmitter and determining the phase characteristics of the detected signal to determine the location of the current collector relative to the signal transmitter.

3. Method according to f claim 1, comprising transmitting a signal comprising an asymmetric pulse train.

4. Method according to claim 1, comprising-transmitting a signal comprising an amplitude modulated pulse train.

5. Method according to claim 2, comprising-transmitting a signal generated by a digital modulation scheme.

6. Method according to claim 5, comprising transmitting a signal generated by phase shift keying.

7. Method according to claim 2, comprising-transmitting a signal comprising a Fourier series.

8. Method according to claim 2, comprising-transmitting a signal comprising a pseudo-random noise sequence.

9. Method according to claim 2, comprising-transmitting a signal comprising a frequency modulated pulse train.

10. Method according to claim 1 comprising-detecting the phase characteristics, phase shift and amplitude of the signal induced in at least one vertical antenna, indicating the location of the vertical antenna relative to the longitudinal direction of the signal transmitter.

11. Method according to claim 1, comprising-controlling the positioning means to move the current collector substantially vertically the first towards the second positions when the presence of the current conductor is detected.

12. Method according to claim 1, comprising-controlling the positioning means to move the current collector substantially vertically to an intermediate position between the first and second positions when the presence of the current conductor is detected.

13. Method according to claim 11, comprising-locating the current conductor using the at least one detected signal from the signal receiver and controlling the positioning means to move the current collector at least transversely to track the current conductor.

14. Method according to claim 13, comprising controlling the positioning means to move the current collector vertically and transversely into the second position, while tracking the current conductor.

15. Arrangement for transmitting electric power between a current conductor and a vehicle, the arrangement comprising a current collector mounted on the vehicle and arranged to be displaced between a retracted first position and an operative second position in contact with the current conductor; positioning means for moving the current collector at least in the vertical direction of the vehicle; a signal transmitter is connected to the current conductor; a signal receiver arranged on the vehicle to receive signals from the signal transmitter; and a control device for controlling the positioning means in dependence of the received signals; wherein the signal receiver comprises multiple transversely spaced vertical antennas: detecting the phase characteristics of the signals induced in the multiple transversely spaced vertical antennas, indicating the relative location of the vertical antennas and the signal transmitter in the transverse direction of the vehicle; comparing phase characteristics of each signal to determine the transverse location of the vertical antennas relative to the longitudinal direction of the signal transmitter; and controlling the positioning means in dependence of the received signals and the determined location of the current collector relative to the signal transmitter.

16. Arrangement according to claim 15, wherein the signal transmitter is arranged to emit a pulse train having predetermined non-symmetric phase characteristics and that the control device is arranged to determine the phase property of at least one detected signal to determine the location of the at least one vertical antenna relative to the signal transmitter.

17. Arrangement according to claim 15, wherein the signal transmitter is arranged to emit continuous or intermittent asymmetric pulse trains.

18. Arrangement according to claim 16, wherein the signal transmitter is arranged to emit a signal comprising a Fourier series.

19. Arrangement according to claim 16, wherein the signal transmitter is arranged to emit a signal generated by a digital modulation scheme.

20. Arrangement according to claim 16, wherein the signal transmitter is arranged to emit a signal comprising a pseudo-random noise sequence.

21. Arrangement according to claim 16, wherein the repeated pulse trains are amplitude and/or frequency modulated.

22. Arrangement according to claim 15, wherein the control device is arranged to determine the phase characteristics of signals detected by two or more transversely spaced antenna s and to compare phase characteristics of each signal to determine the location of the antenna s relative to the longitudinal direction of the signal transmitter.

23. Arrangement according to claim 15, wherein the signal receiver comprises at least one vertical antenna arranged to monitor the received signal and to detect a phase reversal of the signal induced in the vertical antenna, indicating that the antenna is located vertically above the signal transmitter.

24. Arrangement according to claim 15, wherein the at least one vertical antenna is arranged on a fixed location on the vehicle.

25. Arrangement according to claim 15, wherein the at least one vertical antenna is arranged on the current collector.

26. A vehicle comprising a current collector and a signal receiver according to claim 15, wherein the vehicle is operable as a component part of the claimed arrangement.

27. A computer comprising a computer program for performing the steps of claim 1 for inductive positioning of a current collector on a vehicle relative to a current conductor when the program is run on the computer.

28. A non-transitory computer readable medium carrying a computer program for performing the steps of claim 1 for inductive positioning of a current collector on a vehicle relative to a current conductor when the program product is run on a computer.

29. A control unit for inductive positioning of a current collector on a vehicle relative to a current conductor, the control unit being configured to perform the steps of the method according to claim 1.

\* \* \* \* \*